3,524,847
SALTS OF LEVAN-SULFURIC ACID WITH ORGANIC BASES AND PROCESS FOR PREPARING THEM
Horst Grotsch, Frankfurt am Main, and Heinz Feier, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed May 7, 1968, Ser. No. 727,350
Claims priority, application Germany, May 12, 1967, F 52,396
Int. Cl. C08b 19/02
U.S. Cl. 260—234      2 Claims

ABSTRACT OF THE DISCLOSURE

Salts of levan-sulfuric acid with alkanolamines alkylenediamines or basic amino-acids for precutaneous application to increase lipoproteid-lipase activity.

---

We have found that salts of levan-sulfuric acid which are soluble in organic solvents can be obtained by reacting levan-sulfuric acid with alkanolamines, alkylenediamines or basic amino-acids.

The levan-sulfuric acid used as the starting substance may be prepared by sulfuration of levan with chlorosulfonic acid or oleum and, if desired, following partial depolymerisation of the product.

The alkanolamines used for the salt formation according to the present invention may be primary, secondary or tertiary straight chain or branched alkanolamines. Suitable alkanolamines are, for example, ethanolamine, hexanolamine, octanolamine, 1-amino-2-methyl-propanol, diethanolamine, dibutanolamine, triethanolamine, methylaminoethanol, ethylaminoethanol, dimethylaminoethanol, diethylaminoethanol and tris-hydroxymethyl-aminomethane ("Tris").

The alkylenediamines used according to the present invention may also be primary, secondary or tertiary alkylenediamines. Suitable alkylenediamines are, for example: 1,3-diaminopropane, 1,4-diaminobutane (putrescine), 1,5-diaminopentane (cadaverine), 1,8-diamino-octane, 1,3-diamino-hexane, bis-(diethanolamino)-ethane.

As basic amino-acids, there may be used arginine, ornithine and lysine.

For preparing the salts of the present invention the levan-sulfuric acid is neutralized by an organic base in an aqueous solution and the salt formed is isolated. Preferably, the levan-sulfuric acid is set free from the sodium salt in an aqueous solution by means of cation exchangers, the solution is neutralized by the addition of the organic base and the salt is isolated, for example, by drying.

The salts of levan-sulfuric acid obtained according to the present invention are easily soluble in ethanol, propanol, isopropanol and dimethyl-formamide. The solutions are absorbed by the skin, whereby the heparinoic properties of the levan-sulfate are fully deployed.

The products of the present invention are applied percutaneously preferably in the form of gels or ointments. The concentration of the active substance may amount to 1–20%. As the solvent, dimethyl-sulfoxide is preferably used.

The following examples illustrate the invention but they are not intended to limit it thereto:

EXAMPLE 1

(a) 30 g. of the sodium salt of levan sulfate, having a viscosity of $\eta=1.90$, were dissolved in 300 ml. of water and, after passage through a column charged with a cation exchanger (for example, Amberlite IR–120 [styrene-divinyl-benzene polymer with sulfo-groups; producer: Röhm & Haas, Philadelphia]), neutralized with diethylaminoethanol. The solution was evaporated to dryness. The product was dissolved by the addition of DMSO. In this manner, a 30% solution was prepared which could be used for pharmaceutical purposes. The solubility in methanol, ethanol, propanol was found to be 20%, in chloroform 10%. For examining the therapeutic activity, DMSO-solutions were applied at different time intervals onto the skin of dogs or rabbits and the activation of the lipoproteid-lipase (LPL) was determined, the increase of which may reach within 2 hours an amount of three to six times the initial value.

(b) 30 g. of the sodium salt of levan sulfate having a viscosity of $\eta=0.06$ were converted as described in Example 1(a) into the free levan-sulfuric acid, neutralized with an aqueous solution of diethylaminoethanol and worked up. A product having similar solubility properties as described above was obtained. The LPL likewise increased to an amount of three times the initial value.

(c) 30 g. of the sodium salt of levan sulfate having a viscosity of $\eta=0.03$ were converted as described in Example 1(a) into the free levan-sulfuric acid, neutralized with an aqueous solution of diethylaminoethanol and worked up. A product having similar solubility properties as described above was obtained. The LPL likewise increased to an amount of six to eight times the initial value.

The product is soluble in DMSO up to a concentration of 30%, in methanol, ethanol, propanol up to a concentration of 20% and in chloroform up to a concentration of 10%.

EXAMPLE 2

30 g. of the sodium salt of levan sulfate having a viscosity of $\eta=0.06$ were converted as described in Example 1 into the free levan sulfuric acid. Triethylamine was used for the neutralization. The product obtained after working up was soluble in methanol, ethanol and DMSO. The solubility properties were analogous to those described in Example 1.

EXAMPLE 3

30 g. of the sodium salt of levan sulfate having a viscosity of $\eta=0.06$ were converted as described in Example 1 into the free levan-sulfuric acid. Tri-n-butylamine was used for the neutralization. The product obtained after working up was very easily soluble in methanol, ethanol, propanol, acetone, chloroform and DMSO. The solubility properties were analogous to those described in Example 1.

EXAMPLE 4

30 g. of the sodium salt of levan sulfate having a viscosity of $\eta=0.06$ were converted as described in Example 1 into the free levan-sulfuric acid. Diethanolamine was used for the neutralization. The product obtained after working up was found to be soluble in DMSO up to 40%.

EXAMPLE 5

30 g. of the sodium salt of levan sulfate having a viscosity of $\eta=0.06$ were converted as described in Example 1(a) into the free levan-sulfuric acid. Tris-(hydroxymethyl) aminomethane was used for the neutralization. The product obtained after working up was soluble in DMSO up to 20%, in ethanol up to 10% and in acetone and propanol up to 5%.

EXAMPLE 6

30 g. of the sodium salt of levan sulfate having a viscosity of $\eta=0.06$ were converted as described in Example 1(a) into the free levan-sulfuric acid. 1,6-diaminohexane was used for the neutralization. The product obtained after working up was found to be soluble in DMSO, chloroform, ethanol and propanol up to 20%.

The LPL activity increases with the aid of the products of the present invention to an amount three to four times of the initial value within a period of 3 hours.

We claim:

1. Salts of levan-sulfuric acid with lower alkanolamines, lower alkylenediamines or basic amino-acids selected from the group consisting of arginine, ornithine and lysine.

2. The salt of levan-sulfuric acid with diethylaminoethanol.

References Cited

UNITED STATES PATENTS

| | | | |
|---|---|---|---|
| 2,917,506 | 12/1959 | Caldwell et al. | 260—234 |
| 3,089,869 | 5/1963 | Mauvernay | 260—234 |
| 3,359,162 | 12/1967 | Ghielmetti | 260—234 |

LEWIS GOTTS, Primary Examiner

J. R. BROWN, Assistant Examiner

U.S. Cl. X.R.

260—999